US012477966B2

(12) United States Patent
Clemens

(10) Patent No.: US 12,477,966 B2
(45) Date of Patent: Nov. 25, 2025

(54) AGRICULTURAL MACHINE WITH A SOIL TILLAGE TOOL AND METHOD FOR CONTROLLING A SOIL TILLAGE TOOL

(71) Applicant: Clemens GmbH & Co. KG, Weinbautechnik Getränketechnik, Wittlich (DE)

(72) Inventor: Bernhard Clemens, Greimerath (DE)

(73) Assignee: Clemens GmbH & Co. KG, Weinbautechnik—Getränketechnik, Wittlich (DE)

( * ) Notice: Subject to any disclaimer, the term of this patent is extended or adjusted under 35 U.S.C. 154(b) by 868 days.

(21) Appl. No.: 17/688,556

(22) Filed: Mar. 7, 2022

(65) Prior Publication Data

US 2022/0279695 A1 Sep. 8, 2022

(30) Foreign Application Priority Data

Mar. 5, 2021 (EP) .................................... 21161083

(51) Int. Cl.
*A01B 33/06* (2006.01)
*A01B 63/00* (2006.01)

(52) U.S. Cl.
CPC ............ *A01B 33/06* (2013.01); *A01B 63/002* (2013.01)

(58) Field of Classification Search
CPC ....... A01B 33/06; A01B 63/002; A01B 39/18; A01B 39/20; A01B 39/16; A01G 17/00
USPC .......................................................... 701/50
See application file for complete search history.

(56) References Cited

U.S. PATENT DOCUMENTS

| | | | | | |
|---|---|---|---|---|---|
| 3,913,681 A | * | 10/1975 | Lincoln | ................ | A01B 39/166 172/112 |
| 4,491,183 A | * | 1/1985 | Anderson | ............ | A01B 39/166 172/111 |
| 4,518,043 A | * | 5/1985 | Anderson | ............ | A01B 39/166 172/6 |
| 4,585,071 A | * | 4/1986 | Anderson | ............ | A01B 39/166 172/6 |
| 4,660,649 A | * | 4/1987 | Anderson | ............ | A01B 39/166 60/426 |

(Continued)

FOREIGN PATENT DOCUMENTS

FR 2555860 6/1985

*Primary Examiner* — Tuan C To
*Assistant Examiner* — Dominick Mulder
(74) *Attorney, Agent, or Firm* — Lowe Graham Jones PLLC

(57) ABSTRACT

An agricultural machine for arrangement on a vehicle, wherein during movement of the machine in the travel direction an area of soil at least between plants arranged parallel to the travel direction in row crops can be tilled by the machine, wherein the machine comprises a soil tillage tool, which is pivotable back, counter to the travel direction, about an axis of rotation running in a height direction of the machine out of a transverse direction arranged perpendicular to the travel direction and perpendicular to the height direction and/or is movable towards the machine in the transverse direction, an obstacle sensor by which obstacles can be detected, and comprises a control device, wherein when an obstacle is detected the control device can pivot the soil tillage tool back out of the transverse direction counter to the travel direction and/or move it in the transverse direction towards the machine.

11 Claims, 6 Drawing Sheets

(56) References Cited

U.S. PATENT DOCUMENTS

| | | | | |
|---|---|---|---|---|
| 4,936,390 | A * | 6/1990 | Anderson | A01B 39/166 172/111 |
| 6,330,922 | B1 * | 12/2001 | King | A01B 13/025 172/686 |
| 6,935,435 | B1 * | 8/2005 | Shenk | A01B 39/14 172/600 |
| 2011/0192618 | A1 * | 8/2011 | Nance | A01B 23/06 172/1 |
| 2014/0277965 | A1 * | 9/2014 | Miller | A01C 21/005 701/50 |
| 2020/0221630 | A1 * | 7/2020 | Pomedli | G05D 1/0088 |
| 2022/0022359 | A1 * | 1/2022 | Warming | A01M 21/02 |
| 2022/0183208 | A1 * | 6/2022 | Sibley | G05D 1/0246 |
| 2022/0183214 | A1 * | 6/2022 | Corpstein | A01B 17/002 |

\* cited by examiner

AGRICULTURAL MACHINE WITH A SOIL TILLAGE TOOL AND METHOD FOR CONTROLLING A SOIL TILLAGE TOOL

PRIORITY CLAIM

This application claims the benefit of priority from European Patent Application No. 21161083.7 filed Mar. 5, 2021, the contents of which is incorporated herein by reference.

FIELD OF THE INVENTION

The invention relates to an agricultural machine for arrangement on an agricultural vehicle, wherein during movement of the machine in the travel direction F an area of soil, at least between plants arranged parallel to the travel direction in row crops, can be tilled by the machine, wherein the machine comprises a soil tillage tool, which is pivotable back, counter to the travel direction, about an axis of rotation running in a height direction of the machine out of a transverse direction arranged perpendicular to the travel direction and perpendicular to the height direction and/or is movable towards the machine (1) in the transverse direction (Q), the machine also comprising an obstacle sensor by which obstacles, in particular plants and planting sticks of the row crop, can be detected, as well as a control device, wherein when an obstacle is detected the control device can pivot the soil tillage tool back out of the transverse direction counter to the travel direction and/or move it in the transverse direction (Q) towards the machine (1).

BACKGROUND OF THE INVENTION

Agricultural machines of this type are regularly used in fruit cultivation and viticulture. In this case it is necessary also to till the soil between the plants of the row crop. In order for this to be possible with an agricultural vehicle which moves along a row of plants of a row crop, the agricultural vehicles have one or more agricultural machines as previously described. The ability of the soil tillage tool to pivot back when an obstacle is detected prevents the soil tillage tool from colliding with the plants of the row crops or with other obstacles.

The soil tillage tool is preferably arranged as a lateral arm of the agricultural machine. This means that an area of soil adjacent to the route of the agricultural vehicle can be tilled by the soil tillage tool. This area of soil is in particular an area of soil between the plants of a row of plants of the row crop. Many plants, in particular grapevines, and also many fruit crops are very sensitive to the soil tillage tool running into the stem of the plant. This is prevented by the obstacle recognition and the pivoting back of the soil tillage tool when an obstacle is recognized. In this way damage to the root system of the plant by the soil tillage tool is also prevented. As a rule the obstacle recognition takes place by a sensor ahead of the soil tillage tool. The sensor recognizes the obstacle and thus triggers the pivoting back. After a certain time which at constant speed of travel corresponds to a specific distance, the soil tillage tool automatically pivots back into its starting position.

However, if the ground has inclines where the rows are planted, these agricultural machines have limitations. Plants always grow parallel to a vertical direction which extends to the center of the earth. Thus on an incline the plants grow at an angle to the ground normal. It can happen here that due to the incline and the associated effective oblique positioning of the plants by comparison with a ground normal the sensor is triggered too early or too late and thus the soil tillage tool is not pivoted back at the right time or is pivoted back too early, so that a collision can occur between the soil tillage tool and the obstacle. Such collisions should be avoided, since the soil tillage tool and also the row crop can be damaged. In addition, if pivoting back occurs too late or too early an untilled area of soil remains behind or in front of the plant, which is likewise undesirable.

In the document FR 2 555 860 A1 a system is already disclosed in which an obstacle sensor can be set manually, so that it can be shifted further forwards or backwards in the travel direction with respect to the soil tillage tool. As a result a soil tillage tool can be guided at a lesser distance around plants in the row crop and as a result the area of soil which is not tilled between plants can be minimized. However, the adjustment of the obstacle sensor takes place mechanically and manually and accordingly always has to be readjusted as the slope changes, which is not satisfactory in particular bearing in mind the time required for adjustment.

Therefore the object of the present invention is to provide an agricultural machine by which soil tillage is possible between plants in row crops arranged parallel to the travel direction, without there being a risk of a collision between a soil tillage tool and a row crop in the event of inclines.

SUMMARY OF THE INVENTION

The invention relates to an agricultural machine for arrangement on an agricultural vehicle, wherein during movement of the machine in the travel direction an area of soil at least between plants arranged parallel to the travel direction in row crops can be tilled by the machine, wherein the machine comprises a soil tillage tool, which is pivotable back, counter to the travel direction, about an axis of rotation running in a height direction of the machine out of a transverse direction arranged perpendicular to the travel direction and perpendicular to the height direction and/or is movable towards the machine in the transverse direction, an obstacle sensor by which obstacles, in particular plants and planting sticks of the row crop, can be detected, and comprises a control device, wherein when an obstacle is detected the control device can pivot the soil tillage tool back out of the transverse direction counter to the travel direction and/or move it in the transverse direction towards the machine. The invention is characterized in that the control device comprises a delay device, which delays the pivoting back and/or the moving towards the machine after detection of an obstacle, and a setting device, wherein with the setting device a time delay amount of the delay device can be set during a soil tillage run. The invention further comprises a method for controlling a soil tillage tool.

The invention is characterized in that the control device of the agricultural machine comprises a delay device, which delays the pivoting back or the moving towards the machine after detection of an obstacle, and a setting device, wherein with the setting device an amount of the time delay of the time delay device can be set during a soil tillage run.

Because the amount of the time delay can be set during the soil tillage run, the amount of the time delay can be adapted at any time to the current incline along the row crop. According to the invention the setting facility is provided during the soil tillage run. This means that the soil tillage does not have to be interrupted for setting of the time delay amount.

The term "row crop" in the context of this invention describes any arrangement of useful plants in rows.

During the pivoting movement the soil tillage tool rotates around an axis of rotation running in a height direction of the machine, wherein the soil tillage tool is pivoted back, opposite to the travel direction, out of the transverse direction perpendicular to the travel direction and perpendicular to the height direction. Alternatively in this connection it is conceivable that instead of the pivoting movement a linear movement of the soil tillage tool takes place towards the machine. In this variant the soil tillage tool is preferably moved in the transverse direction and out of its position as an arm towards the machine. In this case it is also conceivable that the soil tillage tool is drawn into the machine. Moreover, a combination of pivoting and linear movement of the soil tillage tool is conceivable. When reference is made below to a pivoting back or a pivoting movement of the soil tillage tool, an alternative linear movement or a combination of linear and pivoting movement is also always conceivable.

The soil tillage tool preferably comprises a share which, by undercutting 30-50 mm below the surface of the earth, undercuts weeds and thus effectively combats them. Depending upon the field of application, undercutting by up to 250 mm can take place. The soil tillage tool preferably also comprises further tool components in addition to the share, for example rotary heads, ploughs or cultivators, but all other types of known tool components are conceivable.

In this connection it is also conceivable that a time delay amount of zero seconds can be set. In this case the pivoting back of the soil tillage tool after detection of an obstacle would not be delayed by the delay device. However, it is also conceivable that there is a permanent delay inherent in the system between detection of an obstacle and pivoting back of the soil tillage tool, so that it is conceivable that, for setting a minimum time delay, to set a time delay amount of zero seconds in the delay device.

The soil tillage tool in the turned-back state preferably tills a narrower area of soil (measured along the transverse direction) than in the starting position. Due to the turning back of the soil tillage tool towards the agricultural machine and away from the plants of the row crop (viewed along the transverse direction), the narrower area of soil is located directly alongside the route of the agricultural machine, but is spaced apart from the planted rows with respect to the transverse direction. Thus a collision between the soil tillage tool and the plants of the planted rows is effectively prevented.

Moreover, it is conceivable that the soil tillage tool stops the soil tillage automatically, and that it is turned back. In this embodiment the soil tillage tool preferably continues the soil tillage automatically and also returns to its starting position.

According to at least one further embodiment the delay device is designed as an electronic control system. With the electronic control system a signal, which is generated when an obstacle is detected by the obstacle sensor, can be delayed before it is passed on to the control of the soil tillage tool. The electronic control system is a component of the control device. The delay device is preferably electronic. However, an electric or hydraulic design is also conceivable.

According to at least one further embodiment, in addition to the signals of the obstacle sensor also the current speed of travel of the vehicle, the time and the current position of the soil tillage tool are detected in the control device. In addition a distance value is stored in the control device. This distance value defines the distance before a detected obstacle at which the soil tillage tool should be pivoted back. Preferably this distance value likewise defines the distance after a detected obstacle at which the soil tillage tool is pivoted back. The current position of the soil tillage tool preferably also includes a depth of insertion of the soil tillage tool into the soil, in other words the undercutting depth. The distance value is preferably 100 mm.

The speed can also result without detection of the other previously mentioned parameters. In this case the agricultural machine comprises a speed sensor, wherein the time delay amount can be set automatically and dynamically by the setting device depending upon the measured speed in addition to the dependence upon the slope angle.

On the basis of all this information the control device calculates a current time delay value which is then set in the delay device by the setting device. Thus it is ensured that the pivoting back always takes place at the required optimal distance from the obstacle.

It is conceivable that the distance value can be set by the user of the machine. This is preferably possible only in a separate region and/or a protected area of the operating interface, for example in an expert operating mode.

It is also conceivable that the pivoting back of the soil tillage tool takes place only partially, depending upon the type of signal of the obstacle sensor. As a result it is ensured that the soil tillage tool is moved only as far as is necessary to avoid a collision. In this embodiment the control device also detects the position of the soil tillage tool and the type of obstacle sensor signal (for example the angle of deflection with a rotatable feeler rod).

According to at least one further embodiment, the control device comprises a pivoting device by which the soil tillage tool is pivotable, or a linear shifting unit by which the soil tillage tool is movable, and a controllable signal generator by which the pivoting device can be controlled, wherein the signal generator is merely connected indirectly via the delay device to the obstacle sensor. Thus the signal of the obstacle sensor is always first transmitted to the delay device and then further to the control means of the soil tillage tool, consisting of the signal generator and the pivoting device. The delay device transmits the signal with a delay to the signal generator, so that after detection of an obstacle by the obstacle sensor a delayed control of the signal generator takes place, wherein the duration of the delay corresponds to the set time delay amount in the time delay device. The signal generator is preferably designed as a solenoid valve. The pivoting device is preferably a single- or double-acting hydraulic cylinder, but it is also conceivable to use other pivot drives, such as for example a servomotor, a radial piston motor or similar drives.

According to at least one further embodiment the time delay amount can be set continuously within a time period by the setting device. A lower limit of the time period of zero seconds is preferred. From this low value any positive value can preferably be set continuously.

According to a preferred embodiment the setting device can be controlled by a regulator which can be actuated manually during the soil tillage run. This regulator is preferably arranged in a driver's cab of the agricultural vehicle. Thus during the travel the operator of the soil tillage machine can actuate the regulator and can set a control value which represents travel uphill, travel downhill or travel on level ground. The control value preferably also represents the respective incline. The regulator is preferably designed as a detent switch which can be set in three positions. These positions preferably have corresponding markings for uphill travel, downhill travel and travel on level ground.

In another preferred embodiment, in which the control value represents the respective incline, the regulator is designed as a rotary or slide regulator. However, a purely electronic design of the regulator is also conceivable, for example as a touchscreen.

According to at least one further embodiment the machine also comprises a position sensor, by which a slope angle in the travel direction is continuously measurable, wherein the amount of the time delay can be set automatically and dynamically by the setting device depending upon the slope angle. Due to the position sensor a manual setting of the time delay by the driver of the vehicle is no longer necessary. Instead, the setting of the time delay now takes place fully automatically, and the position sensor detects the slope angle. The time delay amount is then set depending upon this continuously detected slope angle. This takes place fully automatically with the setting device. Thus it is ensured that at any time the optimal time delay amount is set in the delay device. As a result a collision of the soil tillage with an obstacle is particularly effectively avoided. The position sensor can be designed as an angle sensor, as a gyro sensor or also as a GPS-based sensor, but in principle any other suitable measurement of the slope angle in the travel direction is conceivable.

According to a preferred embodiment the position sensor is arranged on the pivoting device or the shifting unit of the soil tillage tool. By the arrangement of the position sensor on the pivoting device or the shifting unit a particularly precise detection of the position angle takes place very close to the soil tillage tool. At this position the current slope angle of the soil tillage tool is detected particularly precisely, so that a particularly exact setting of the time delay amount is thereby possible. It is also conceivable that the position sensor is arranged on the agricultural machine or on the agricultural vehicle.

According to a preferred embodiment the obstacle sensor is designed as a mechanical feeler, wherein an obstacle is detected when a minimum actuation of the feeler is exceeded.

According to a preferred embodiment the feeler is designed as a rod which is rotatable from the travel direction into the transverse direction and parallel to the ground, wherein the minimum actuation corresponds to a minimum angle of rotation. The mechanical feeler preferably runs ahead of the soil tillage tool, wherein the lead is considered in relation to the direction of travel. The lead of the rotatable rod can preferably be set by means of a perforated disc with locking bolt. The position of the unprocessed remain island which remains untilled around an obstacle, and which results from the path travelled with the soil tillage tool turned back, can be set by means of the lead. This position of the untilled island around an obstacle is also ensured on a slope by the delay device. In the event of a very large amount of the slope angle—that is to say very steep positions—the size of the untilled island is preferably increased automatically. This takes place depending upon the speed of travel by even earlier turning back and simultaneously even later turning forward of the soil tillage tool back into the starting position. The embodiment of the obstacle sensor as a mechanical feeler or as a rotatable rod represents a particularly simple and proven as well as robust embodiment of the obstacle sensor.

According to a further embodiment the obstacle sensor is designed as a contactless sensor. The contactless sensor is preferably an ultrasonic sensor, a laser sensor, a 3D laser sensor, a camera system or a satellite-assisted system for determining positions (for example GPS, DGPS, Glonass, Galileo, Beidoou or others) with stored card data or a digital triangulation system for determining positions. In this case, however, further contactless sensor systems are conceivable. Due to the embodiment of the obstacle sensor as a contactless sensor, contact with the obstacles is completely avoided. This can be advantageous in particular in fruit row crops, since several fruit plants react particularly sensitively to being hit. Also fragile devices such as thin rods or wires which are used for cultivation of the plants in rows, and likewise represent obstacles, are protected.

Moreover, the invention is characterized by a method for controlling a soil tillage tool of an agricultural machine according to at least one of the preceding embodiments. The method comprises the following steps:

a. setting the time delay amount between the detection of an obstacle and the pivoting back and/or moving on of the soil tillage tool with the aid of the setting device during a soil tillage run;
b. detecting an obstacle by the obstacle sensor;
c. time-delaying the pivoting back and/or moving on of the soil tillage tool with the aid of the delay device by the previously set time delay amount;
d. pivoting back and/or moving on of the soil tillage tool with the aid of the control device.

According to the invention, the setting of an amount of the time delay during a soil tillage run is possible at any time, regardless of whether or not an obstacle has been detected after the last setting. Thus it is conceivable that the step a is initially carried out multiple times before the steps b to d are carried out. On the other hand it is also conceivable that, after the steps b to d have been carried out, the steps b to d are carried out multiple times one after the other before the step a is carried out again.

According to a preferred embodiment the setting of the amount of the time delay on the setting device during the soil tillage run takes place depending upon a control value set manually by an operator of the agricultural machine (1). In this embodiment in step a the operator of the agricultural machine initially sets a control value manually during the soil tillage run. Such a control value preferably corresponds to one of the three discrete states, travel uphill, travel downhill or travel on level ground. Alternatively it is also conceivable that the control value varies continuously between uphill travel at a maximum upward angle of inclination and downhill travel at a maximum downward angle of inclination. In this case the upward or downward angle of inclination can be represented by the control value. As previously described, this can be done by a regulator or switch, wherein also other manual setting possibilities, such as for example a touchscreen, are conceivable.

According to a preferred embodiment the agricultural machine comprises a position sensor, by which a slope angle in the travel direction is continuously measured and the amount of the time delay is continuously set automatically by the setting device depending upon the slope angle. This embodiment is alternative to the previously described embodiment. In this embodiment the control value is not set manually by the operator of the agricultural machine, but the calculation and setting of the time delay takes place automatically depending upon the measured slope angle. In this case preferably the current measured slope angle to the control device and then the necessary time delay amount are determined and set automatically in the delay device with the aid of the setting device.

According to a preferred embodiment, by comparison with the set time delay during travel on level ground and at a constant speed of travel, in the case of travel uphill the time delay amount is decreased with the aid of the setting device and in the case of travel downhill the time delay amount is increased with the aid of the setting device. This manner of setting the time delay amount ensures that, for each inclination, the soil tillage tool is pivoted back with a constant distance of the soil tillage tool from the obstacle.

Further advantages, aims and properties of the present invention are explained with reference to the following description of the attached drawings. Similar components can have the same references in the various embodiments.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
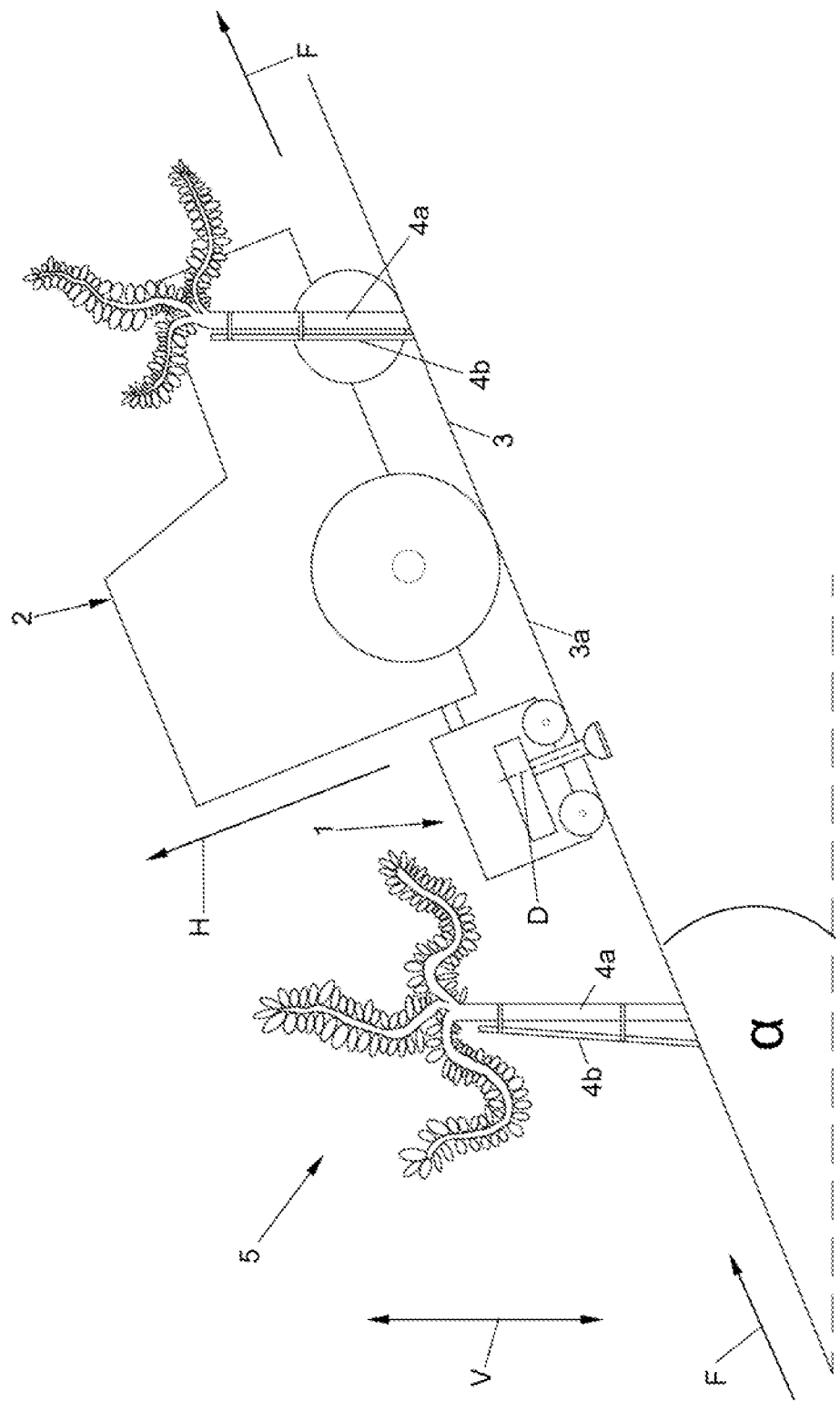
FIG. 1 is an overview representation of the agricultural machine 1 arranged on an agricultural vehicle 2 during soil tillage in a row crop 5 in a side view.

FIG. 1 shows the agricultural machine 1 which is arranged on an agricultural vehicle 2 in the travel direction F during the soil tillage. The agricultural vehicle is preferably any agricultural towing vehicle, particularly preferably an equipment carrier, for example but not definitively a tractor, in particular a hauler, a narrow-track tractor, a high-clearance tractor, a crawler, a unimog or an autonomous equipment carrier. The agricultural machine 1 is moved over the soil 3 by the agricultural vehicle 2. In this case a soil area 3 is tilled by the machine 1 with the aid of the soil tillage tool 6. This area of soil 3a is arranged at least partially between plants 4a of a row crop 5.

In the illustrated embodiment the agricultural vehicle 2 pulls the soil tillage tool agricultural machine 1 over the soil 3. However, it is also conceivable that the agricultural machine 1 is arranged in front of or to the side of the agricultural vehicle 2. Thus the agricultural machine can be arranged at the front, at the rear and/or between the axles of the vehicle. FIG. 1 shows a row crop 5 which is located on a slope. In this illustration the agricultural vehicle 2 with the agricultural machine 1 travels up the slope. In this respect there is a positive slope angle α in the travel direction F.

The plants 4a do not grow for instance perpendicular to the soil 3, but in fact perpendicularly upwards with respect to a vertical direction V which runs to the centre of the earth. The plants 4a of a row crop 5 frequently have further aids which serve for cultivation of the plants 4a in rows. Such aids can be in particular planting sticks 4b or also other aids such as supporting posts or wires (not shown here).

Figure 2:
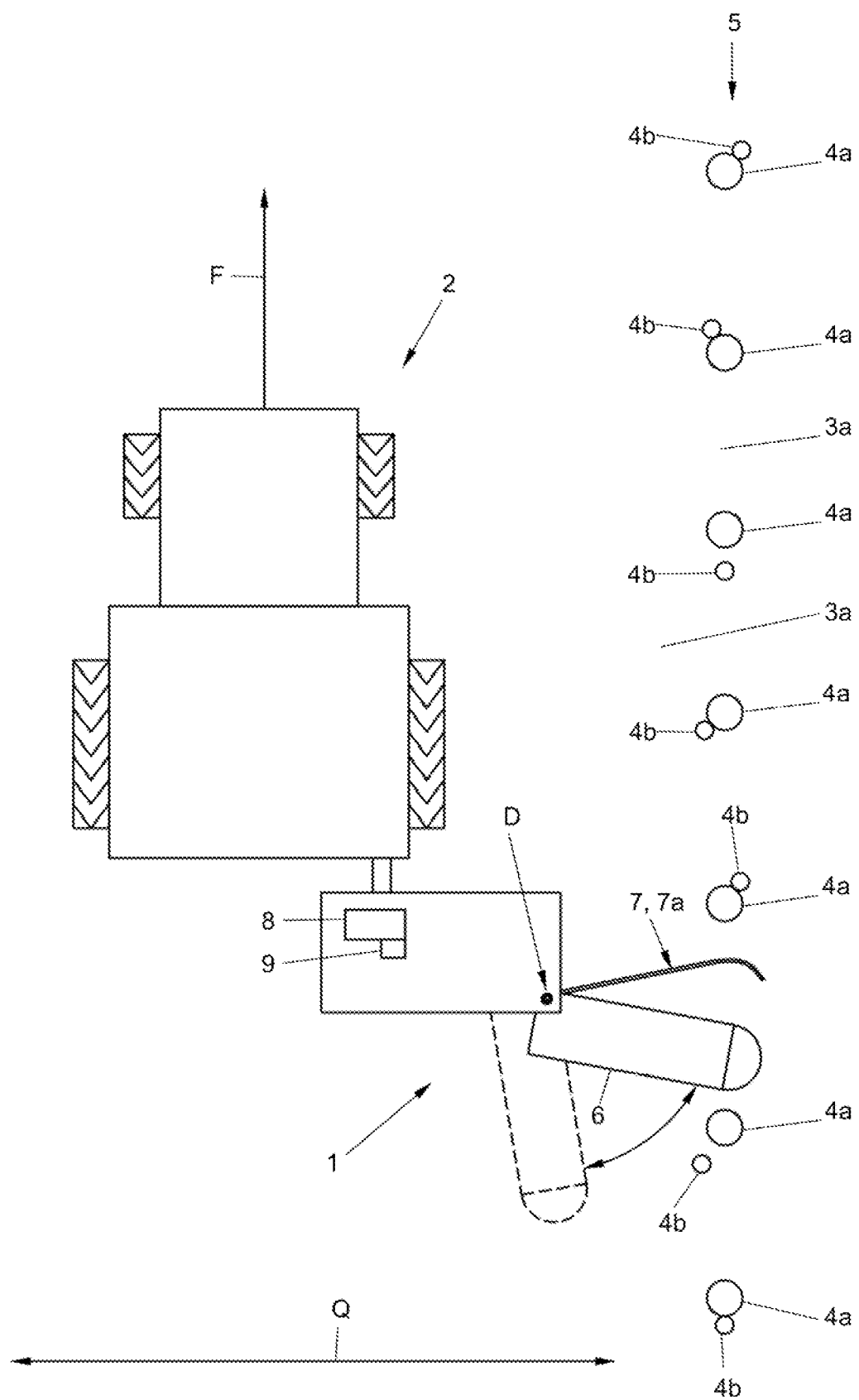
FIG. 2 is a representation of the agricultural machine 1 on an agricultural vehicle 2 during soil tillage in a row crop 5 in a plan view.

FIG. 2 shows the same embodiment of the agricultural machine 1 with the agricultural vehicle 2 in a plan view. In this plan view illustration it can be seen that the soil tillage tool 6 is arranged as a lateral arm on the agricultural machine 1. As a result soil tillage by the soil tillage tool 6 is possible alongside the route of the agricultural vehicle 2. In particular it is possible that as the agricultural vehicle 2 travels along a row crop 5 an area of soil 3a between the plants 4a can be tilled by the soil tillage tool 6. However, in order not to damage the plants 4a it is necessary to pivot the soil tillage tool 6 back before a collision with a plant 4a or any other obstacle 4.

The pivoting back of the soil tillage tool 6, which is arranged projecting laterally out of the agricultural machine 1 as a lateral arm in a transverse direction Q, takes place by rotation thereof about the axis of rotation D out of the transverse direction Q towards the rear in a direction which is counter to the travel direction F. In this case the axis of rotation D is arranged parallel to a height direction H. The height direction H is perpendicular to the soil 3, and thus constitutes the soil normal, and is directed upwards from the soil 3.

In order to ensure that the soil tillage tool 6 pivots back in good time before the contact with an obstacle 4, an obstacle sensor 7 is arranged in front of the soil tillage tool 6 in the travel direction. The obstacle sensor 7 is designed either as a mechanical feeler 7a or as a contactless sensor (not shown here). In the embodiment illustrated here the axis of rotation D of the soil tillage tool 6 coincides with the axis of rotation D of the mechanical feeler 7a. However, it is also conceivable that there are separate axes of rotation. In this case the two axes of rotation are preferably parallel to one another.

By the arrangement of the obstacle sensor 7 in front of the soil tillage tool 6 in the travel direction the obstacle sensor 7 is capable of recognising an obstacle 4 before the soil tillage tool 6 comes into contact with the obstacle 4. Thus the soil tillage tool 6 can be pivoted back towards the rear in good time before contact with the obstacle 4. The agricultural machine 1 then passes the obstacle 4 with a soil tillage tool 6 in the pivoted-back state. After the agricultural machine 1 with the soil tillage tool 6 has passed the obstacle 4, the soil tillage tool 6 pivots again automatically into its starting position as a lateral arm of the agricultural machine 1. Thus the area of soil 3a in front of and behind the obstacle 4 is tilled, wherein a certain area around the obstacle 4 remains untilled.

Figure 3A:
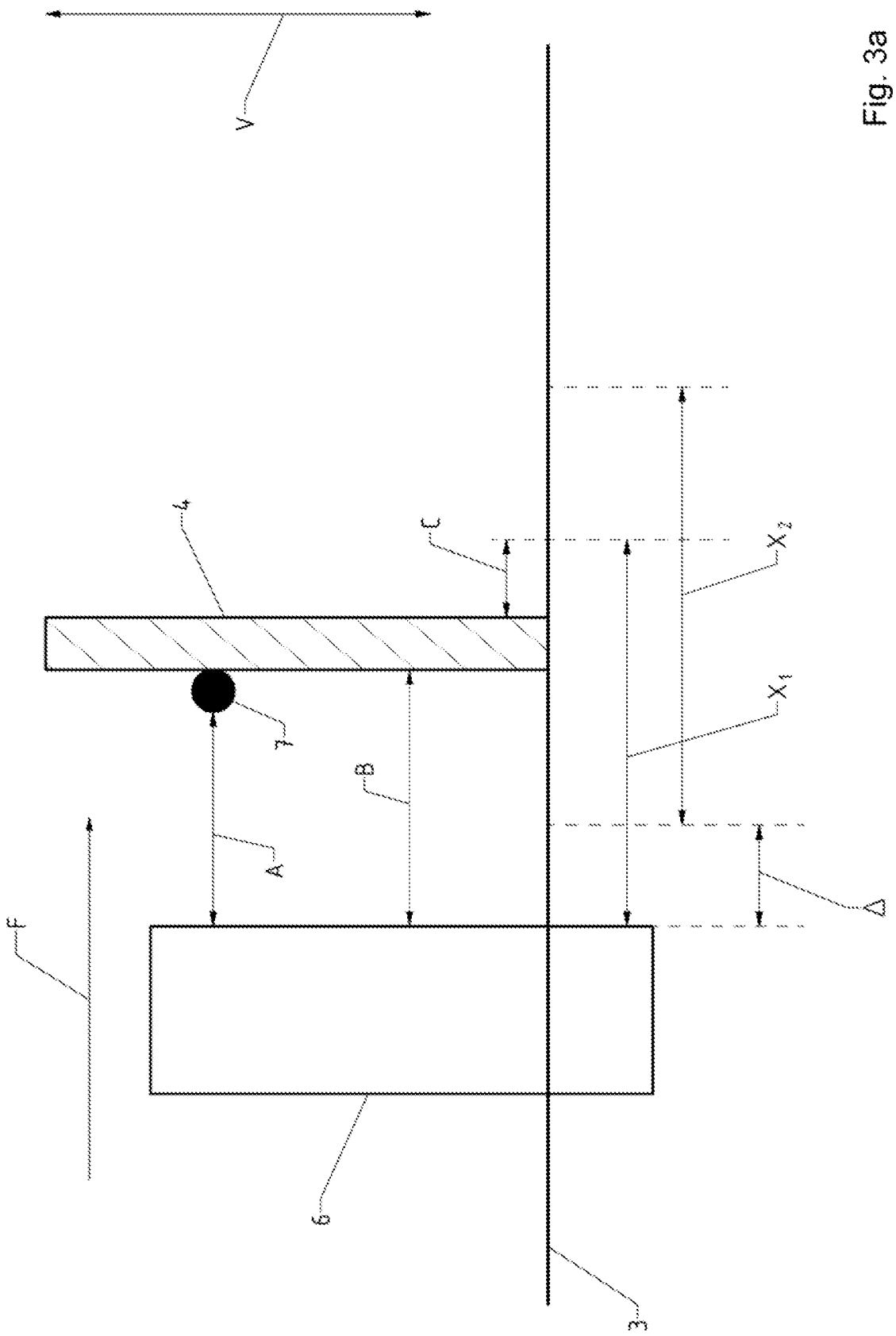
FIGS. 3a-3c are schematic representations of the soil tillage tool 6 and the obstacle sensor 7 at three different ground slope angles.
Figure 3B:
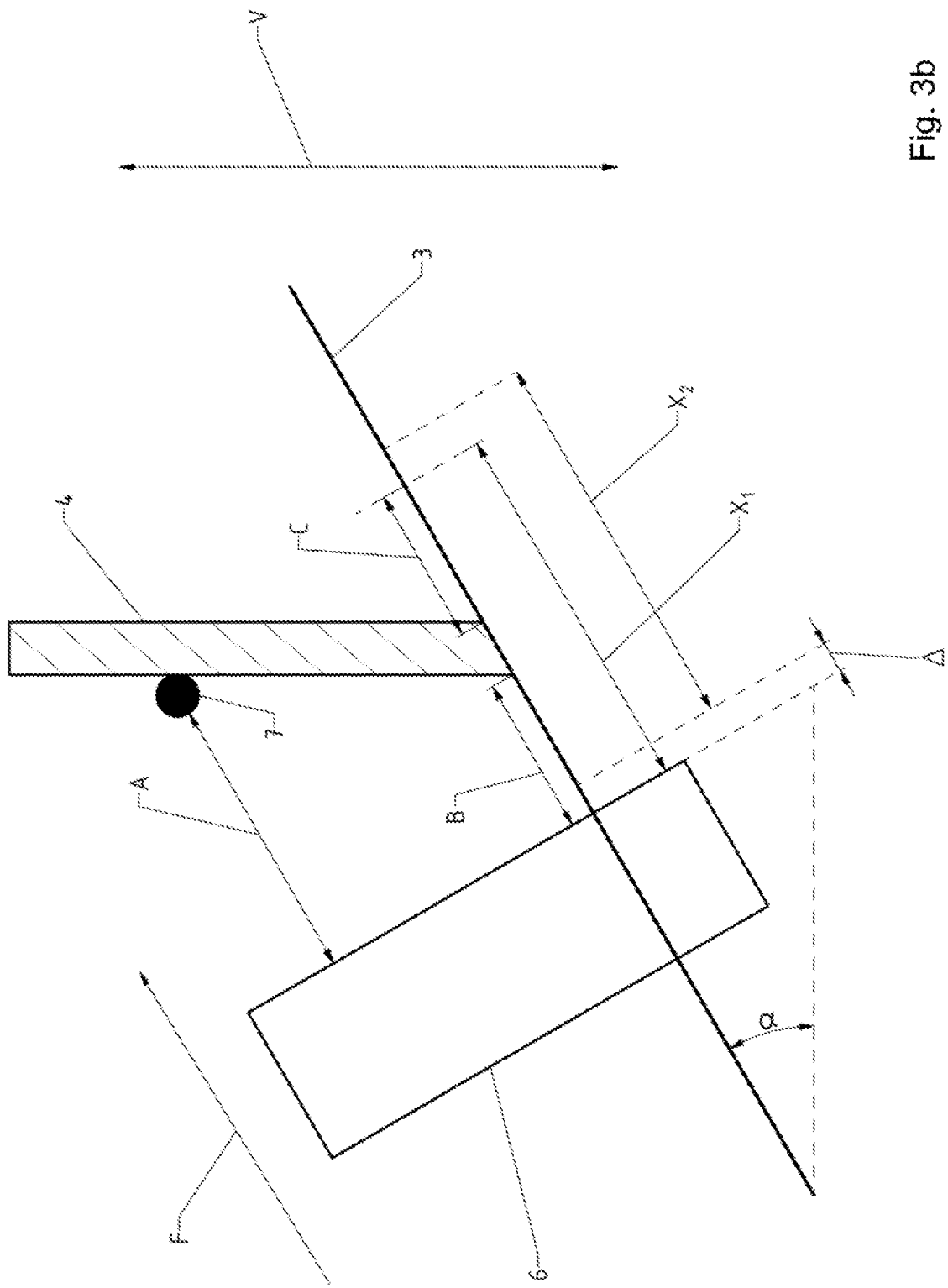
Figure 3C:
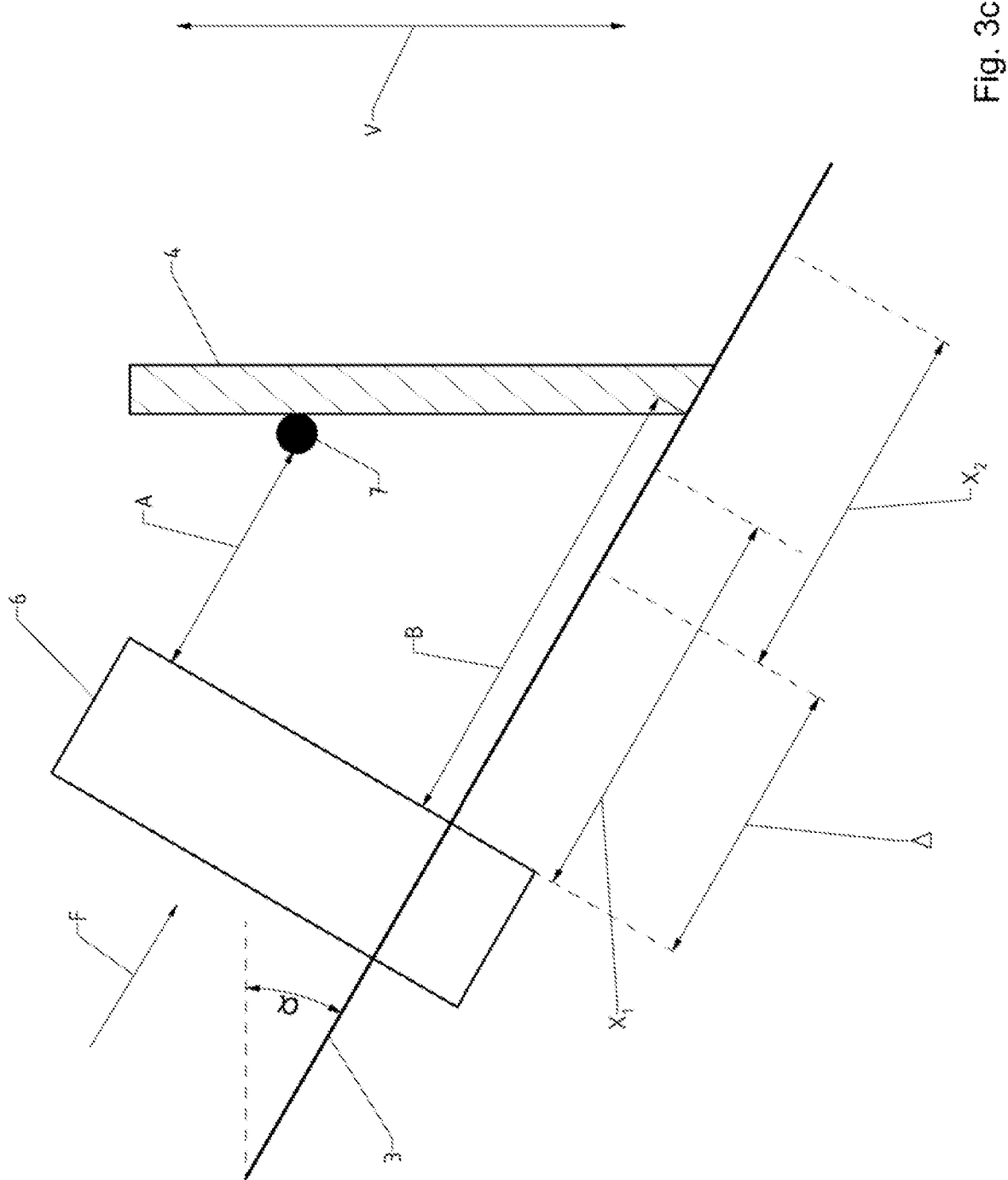

FIGS. 3a to 3c illustrate the problem which arises when a slope angle is 0° the travel direction. FIG. 3a shows a soil tillage tool 6 and an obstacle sensor 7 when travelling in the travel direction F on the level on ground 3. FIG. 3a shows the soil tillage tool 6 as it reaches an obstacle 4 at the moment immediately before the soil tillage tool 6 pivots back out of the starting position. The obstacle sensor 7, which here is designed by way of example as a mechanical feeler 7a, at this moment rests on the obstacle 4 on and in this state generates a sensor signal which then leads to pivoting back of the soil tillage tool 6.

Between the obstacle sensor 7 and the soil tillage tool 6, due to the arrangement of the obstacle sensor 7 in the travel direction in front of the soil tillage tool 6, a distance A is produced between the soil tillage tool 6 and the obstacle sensor 7. In the case of travel on level ground this distance A is approximately equal to the distance B between the soil tillage tool 6 and the obstacle 4. However, differences between the distances A and B result from the diameter of the obstacle sensor 7 designed as a mechanical feeler 7a.

After a certain distance $x_1$ the soil tillage tool 6 pivots out of the pivoted-back position back into its starting position again. The setting of the distance A between the obstacle sensor 7 and the soil tillage tool 6 is set so that, when the soil tillage tool 6 pivots back out of its pivoted-back position into the normal operating position (starting position) after travelling the distance $x_1$ in the turned-back state, the obstacle 4 has already been passed.

This means that behind the obstacle 4 in the travel direction there is a distance C in which the soil tillage tool 6 is still located in the turned-back state. In this the case the obstacle 4 has been successfully circumvented without causing a collision with the soil tillage tool 6.

Problems ensue, however, at a slope angle $\alpha$ in the travel direction F. The case of uphill travel is illustrated in FIG. 3b. Because the agricultural machine 1 with the agricultural vehicle 2 is still moving on the soil 3, the plants 4a which represent obstacles 4 grow in a direction parallel to a vertical direction V, which runs to the centre of the hill, an obstacle 4 in the form of a plant 4a appears to be tilted away forwards from the soil tillage tool 6 in the travel direction F.

If the agricultural machine 1 now encounters an obstacle 4, the situation as illustrated in FIG. 3b ensues. The distance A between the obstacle sensor 7 and the soil tillage tool 6 is set and does not change due to the slope angle $\alpha$. When the obstacle sensor 7 strikes the obstacle 4, due to the slope angle $\alpha$ the distance B is measured directly on the ground 3, but is significantly shorter than the distance A between the soil tillage tool 6 and the obstacle sensor 7. In the extreme case this can lead to a situation where the obstacle sensor 7 has not yet reached the obstacle 4 whilst the soil tillage tool 6 on the ground already collides with the obstacle 4 or with a root ball located below it. This can lead to damage to the soil tillage tool 6 and/or the plant 4a or the aids 4b for cultivation of the plants 4a in rows.

FIG. 3c shows a downhill run of the agricultural machine 1 in the travel direction F on ground 3. This results in a poor situation comparable to that of uphill travel which has been described previously. Again, the distance A between the soil tillage tool 6 and the obstacle sensor 7 is constant. However, due to the slope angle $\alpha$ which is now negative in downhill travel a situation arises in which the obstacle 4 appears to be tilted towards the soil tillage tool. In this case the distance B between the soil tillage tool 6 and the obstacle 4 measured near the ground 3 is significantly greater than the distance A between the soil tillage tool 6 and the obstacle sensor 7 when the obstacle sensor 7 reaches the obstacle 4. This leads to a premature pivoting back of the soil tillage tool 6 which has not yet moved near enough to the obstacle 4.

Since the soil tillage tool 6 always returns again to its starting position after a specific time or preferably a specific distance, in the extreme case during downhill travel it is even possible that the soil tillage tool 6 is already turned forward again into its original position before passing the obstacle 4, so that it collides with the obstacle 4.

A time delay amount $\Delta$ can now be set with the delay device 10 according to the invention and the setting device 11. After detection of the obstacle 4 by the obstacle sensor 7, the soil tillage tool 6 is now turned back by the time amount $\Delta$. Depending upon whether travel is on level ground or uphill or downhill, the time delay amount $\Delta$ can be set accordingly. Preferably for travel on level ground a moderate time delay amount $\Delta$ can be set, for uphill travel a small time delay amount $\Delta$ can be set, and for downhill travel a great time delay amount $\Delta$ can be set in the delay device 10, based on the constant speed of travel.

Due to the time delay $\Delta$, the distance x at which the soil tillage tool 6 is located in a turned-back position, is shifted. In FIGS. 3a-3c the reference $x_1$ marks the distance along which the soil tillage tool without the time delay device 10 is in the turned-back state, and the reference $x_2$ marks the path travelled, along which the soil tillage tool 6 with the time delay device 10 is located in the turned-back state. Due to the correspondingly set time delay amount $\Delta$, the travelled distance $x_2$ in which the soil tillage tool 6 is located in the turned-back state is always optimally placed around the obstacle. Thus due to the delay device 10 there is no collision of the soil tillage tool 6 with the obstacle 4.

The time delay amount $\Delta$ can preferably be continuously set in a time period. The calculation of the optimal time delay amount $\Delta$ preferably takes place by the control device 8 according to the signals of the obstacle sensor 7, the current speed of travel of the vehicle 2 and the current position of the soil tillage tool. The time delay amount $\Delta$ is calculated according to these parameters so that the pivoting back takes place at a distance from the obstacle 4 which corresponds to the stored distance value.

For detecting whether it is travelling uphill, downhill or on level ground, the operator of the machine preferably sets a control value manually for this during the soil tillage run. A design as a switch or detent with three different positions is particularly preferred here, wherein a central position is assigned to travel on level ground and the two outer positions are assigned respectively to uphill travel and travel downhill. According to the selected detent position a corresponding time delay amount $\Delta$ is then calculated and set in the delay device 10.

Alternatively it is also conceivable that the machine operator sets a control value which represents the incline. This can be done by a manual regulator.

Figure 4:
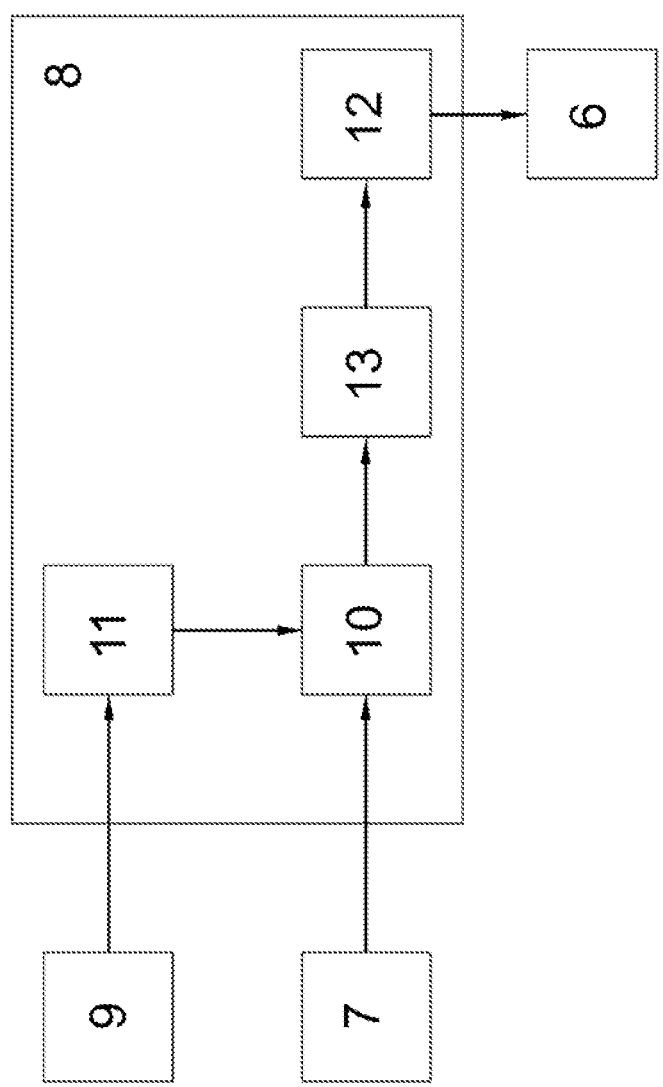
FIG. 4 is a schematic organization chart of the control device 8 with the obstacle sensor 7, the position sensor 9 and the soil tillage tool 6.

The machine preferably comprises a fully automatic setting device 11. In a fully automatic setting device 11 the agricultural machine 1 preferably comprises a position sensor 9. A slope angle $\alpha$ in the travel direction F is determined by the position sensor 9. The detected slope angle $\alpha$ is then passed on from the position sensor 9 to the control device 8. A corresponding control device 8 is shown schematically in FIG. 4. The control device 8 comprises the delay device 10 with the setting device 11, as well as a signal generator 13 and a pivoting device 12. The soil tillage tool 6 can be pivoted rearwards by the pivoting device 12 out of the tillage position into a rest position.

The pivoting device 12 is preferably a single- or double-acting hydraulic cylinder. The pivoting device 12 is controlled by the signal generator 13. Alternatively the pivoting device 12 can be designed as a shifting unit 12. If the signal generator 13 passes a signal to the pivoting device 12 the soil tillage tool 6 is turned rearwards into the rest position. The signal generator 13 is preferably an electromagnetic valve. In this embodiment the obstacle sensor 7 is merely indirectly connected by means of the delay device 10 to the signal generator 13. This means that a sensor signal of the obstacle sensor 7 is not passed on directly to the signal generator 13 (which would trigger a direct pivoting back of the soil tillage tool 6) but the sensor signal of the obstacle sensor 7 is first delayed in the delay device 10 before being passed on to the signal generator 13.

The delay device 10 passes on the sensor signal of the obstacle sensor 7 to the signal generator with a delay by the time delay amount $\Delta$ which can be set by the setting device 11. The slope angle $\alpha$ in the travel direction F is determined by the position sensor. The determined slope angle $\alpha$ is then passed on to the control device 8 where, depending upon the determined slope angle $\alpha$, the current speed of travel of the vehicle and the current position of the soil tillage tool a time delay amount $\Delta$ is determined which ensures a pivoting back of the soil tillage tool at a distance from the obstacle which corresponds to the set distance value.

Preferably, on the basis of a constant speed of travel, when a slope angle $\alpha$ which corresponds to uphill travel is detected, a decreased time delay amount is set by means of the setting device 11, and when a slope angle $\alpha$ which corresponds to downhill travel is detected, an increased time delay amount Δ is set by means of the setting device 11. The setting of the time delay amount Δ depending upon the slope angle α preferably takes place not only qualitatively, that is to say differentiated according to uphill travel or downhill travel. In fact, the time delay amount Δ is preferably increased or decreased by a mathematical function with the detected slope angle α as variable, particularly preferably proportionally to the detected slope angle α. The detection of the slope angle α by the position sensor 9 preferably takes place continuously, so that at any time the optimal time delay amount Δ for the current slope angle α is set by the setting device 11 in the delay device 10 and the pivoting back always takes place at the correct distance from the obstacle 4.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 agricultural machine
2 agricultural vehicle
3 ground
3a area of soil
4 obstacles
4a plants
4b plant stick
5 row crop
6 soil tillage tool
7 obstacle sensor
7a mechanical feeler
7b contactless sensor
8 control device
9 position sensor
10 delay device
11 setting device
11a regulator
12 pivoting device/shifting unit
13 signal generator
A distance from feeler to soil tillage tool
B distance from obstacle to soil tillage tool
C distance to the pivoting back after the obstacle
D axis of rotation
F direction of travel
H height direction
Q transverse direction
V vertical direction
α slope angle
Δ time delay amount While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. Agricultural machine for arrangement on an agricultural vehicle, wherein during movement of the machine in the travel direction (F) an area of soil at least between plants arranged parallel to the travel direction (F) in row crops can be tilled by the machine, wherein the machine comprises
    a soil tillage tool, which is pivotable back, counter to the travel direction, about an axis of rotation (D) running in a height direction (H) of the machine out of a transverse direction (Q) arranged perpendicular to the travel direction (F) and perpendicular to the height direction (H) and/or is movable towards the machine in the transverse direction (Q),
    an obstacle sensor by which obstacles, in particular plants and planting sticks of the row crop, can be detected,
    as well as a control device,
    wherein when an obstacle is detected the control device can pivot the soil tillage tool back out of the transverse direction (Q) counter to the travel direction (F) and/or move it in the transverse direction (Q) towards the machine,
    wherein the control device comprises a delay device, which delays the pivoting back and/or the moving towards the machine after detection of an obstacle, and a setting device, wherein with the setting device a time delay amount (Δ) of the delay device can be set during a soil tillage run, characterized in that the machine also comprises a position sensor, by which a slope angle (α) in the travel direction (F) is continuously measurable, wherein the time delay amount (Δ) can be set automatically and dynamically by the setting device depending upon the slope angle (α).

2. Agricultural machine according to claim 1, characterized in that the delay device is designed as an electronic control system.

3. Agricultural machine according to claim 1, characterized in that in addition to the signals of the obstacle sensor also the current speed of travel of the vehicle, the time and the current position of the soil tillage tool are detected in the control device and furthermore a distance value is stored.

4. Agricultural machine according to claim 1, characterized in that the control device comprises a pivoting device, by which the soil tillage tool is pivotable, or as a linear shifting unit, by which the soil tillage tool is movable, and comprises a controllable signal generator by which the pivoting device is controllable, wherein the signal generator is merely connected indirectly by means of the delay device to the obstacle sensor.

5. Agricultural machine according to claim 1, characterized in that the time delay amount (Δ) can be set continuously within a time period by the setting device.

6. Agricultural machine according to claim 1, characterized in that the position sensor is arranged on the pivoting device or linear shifting unit of the soil tillage tool.

7. Agricultural machine according to claim 1, characterized in that the obstacle sensor is designed as a mechanical feeler, wherein detection of an obstacle takes place when a minimum actuation of the feeler is exceeded.

8. Agricultural machine according to claim 7, characterized in that the feeler is designed as a rod which is rotatable from the travel direction (F) into the transverse direction (Q) and parallel to the ground, wherein the minimum actuation corresponds to a minimum angle of rotation.

9. Agricultural machine according to claim 1, characterized in that the obstacle sensor is designed as a contactless sensor.

10. Method for controlling a soil tillage tool of an agricultural machine according to claim 1, comprising the following steps:
- a. continuously measuring the slope angle ($\alpha$) in the travel direction (F) and continuously automatically setting the time delay amount ($\Delta$) between the detection of an obstacle and the pivoting back and/or moving on of the soil tillage tool with the aid of the setting device and depending upon the slope angle ($\alpha$) during a soil tillage run;
- b. detecting an obstacle by the obstacle sensor;
- c. time-delaying the pivoting back and/or moving on of the soil tillage tool with the aid of the delay device by the previously set time delay amount ($\Delta$); and
- d. pivoting back and/or moving on of the soil tillage tool with the aid of the control device.

11. Method for controlling a soil tillage tool of an agricultural machine according to claim 1, comprising the following steps:
- a. setting the time delay amount ($\Delta$) between the detection of an obstacle and the pivoting back and/or moving on of the soil tillage tool with the aid of the setting device during a soil tillage run;
- b. detecting an obstacle by the obstacle sensor;
- c. time-delaying the pivoting back and/or moving on of the soil tillage tool with the aid of the delay device by the previously set time delay amount ($\Delta$);
- d. pivoting back and/or moving on of the soil tillage tool with the aid of the control device; and
- e. by comparison with the set time delay amount ($\Delta$) during travel on level ground and at a constant speed of travel, in the case of travel uphill the time delay amount ($\Delta$) is decreased with the aid of the setting device and in the case of travel downhill the time delay amount ($\Delta$) is increased with the aid of the setting device.

\* \* \* \* \*